US 6,729,948 B2

(12) United States Patent
Engelvin et al.

(10) Patent No.: US 6,729,948 B2
(45) Date of Patent: May 4, 2004

(54) METHOD AND APPARATUS FOR RECTIFYING CYLINDRICAL ARTICLES, IN PARTICULAR NUCLEAR FUEL PELLETS

(75) Inventors: Pascal Engelvin, Versailles (FR); Michel Marchand, Fontenay-le-Fleury (FR); Serge Masson, Avignon (FR)

(73) Assignee: Compagnie Generale des Matieres Nucleaies, Velizy-Villacoublay (FR)

( * ) Notice: Subject to any disclaimer, the term of this patent is extended or adjusted under 35 U.S.C. 154(b) by 9 days.

(21) Appl. No.: 10/161,815

(22) Filed: Jun. 4, 2002

(65) Prior Publication Data

US 2002/0193057 A1 Dec. 19, 2002

(30) Foreign Application Priority Data

Jun. 5, 2001 (FR) .............................. 01 07300

(51) Int. Cl.⁷ .............................. B24B 41/06
(52) U.S. Cl. .................. 451/407; 451/177; 451/190; 451/194; 451/406
(58) Field of Search .................. 451/177, 190, 451/194, 406, 407

(56) References Cited

U.S. PATENT DOCUMENTS

| 4,004,378 A | 1/1977 | Maxey |
| 6,368,185 B1 * | 4/2002 | Glenville ................ 451/9 |

FOREIGN PATENT DOCUMENTS

| GB | 1 297 095 | 11/1972 | |
| JP | 2001205563 | * 7/2001 | ........... B24B/55/06 |

* cited by examiner

*Primary Examiner*—Joseph J. Hail, III
*Assistant Examiner*—Shantese McDonald
(74) *Attorney, Agent, or Firm*—Cohen, Pontani, Lieberman & Pavane

(57) ABSTRACT

The present invention relates to a method and apparatus for rectifying cylindrical articles, in particular nuclear fuel pellets. In said method, in characteristic manner, the dust generated by the rectification by a working grind wheel acting on said pellets remains confined and practically all of it is entrained beside said working grind wheel so as to be taken away by forced suction.

16 Claims, 3 Drawing Sheets

METHOD AND APPARATUS FOR RECTIFYING CYLINDRICAL ARTICLES, IN PARTICULAR NUCLEAR FUEL PELLETS

In a first aspect, the present invention provides a method of rectifying (i.e. adjusting the size of) cylindrical articles, in particular nuclear fuel pellets. The invention also provides apparatus for rectifying such articles, by implementing said method.

The present invention proposes a novel method and apparatus for confining and collecting the dust produced by rectifying cylindrical articles.

BACKGROUND OF THE INVENTION

Said invention is more particularly positioned and described below in the context of rectifying nuclear fuel pellets, however it is not limited in any way to said context. The person skilled in the art will readily understand that it is applicable to any context involving rectification (adjusting the dimensions) of circularly cylindrical pieces, in particular metal pieces and ceramic pieces.

In said context of rectifying nuclear fuel pellets, the method used at present is described below with reference to FIG. 1. This description of the prior art is made with reference to said FIG. 1 to facilitate understanding thereof and likewise to facilitate subsequent description and understanding of the invention, which invention can be considered as constituting an improvement over that prior art.

In the nuclear fuel fabrication process, the pellets obtained after compressing powders (generally $UO_2$ or $PuO_2+UO_2$) are the subject of uncontrolled shrinkage during a sintering operation which is performed at high temperature (at around 1700° C.).

It is therefore necessary to pass these pellets through a rectifier so as to obtain pellets of very accurate dimensions, prior to grouping them together in cladding in order to form rods.

The rectifier used at present by the Applicant mainly comprises two grind wheels 1 and 2 which are rotated in the same direction:

a working grind wheel 1 which is based on abrasive powder bonded by a metal or organic binder; and a driving grind wheel 2 which is likewise based on abrasive powder bonded by a metal or organic binder.

The cylindrical pellets 3 that are to be rectified are conveyed in a prone position by sliding on a horizontal chute. Rectification is performed by the abrasive action of the working grind wheel 1 against said pellets 3 which are guided one after another on an alignment strip 4 over the entire width of said working grind wheel 1. Said pellets 3 turn under the action of the working grind wheel 1 and they are moved in translation along the axis Oz under the action of the driving grind wheel 2. The abrasive action of the working grind wheel 1 is thus properly distributed over the entire periphery (outside surface) of said pellets 3. The translation direction (along the axis Oz) is determined by appropriately tilting the driving grind wheel 2.

Said two grind wheels, the working grind wheel 1 and the driving grind wheel 2 are rotated in a common direction so that said working grind wheel 1 develops its abrasive action on the pellets 3 in a downward direction. The rectification dust is thus generated mostly in the downward direction and best advantage is thus taken of the "skin effect" due to the rotation of said working grind wheel 1.

The entire assembly is confined in a glove box 6. The confinement in question is both static and dynamic.

The rectification dust is sucked in by suction nozzles 7, 7', and 7":

the first nozzle 7 is positioned at the bottom, beneath the alignment strip 4 and slightly offset towards the working grind wheel 1;

a second nozzle 7' is positioned at the top, vertically above said alignment strip 4; and a third nozzle 7" is provided to suck directly from the protective casing 5' of the driving grind wheel 2.

The protective casings 5 and 5' originally fitted around the grind wheels 1 and 2 are in the form of rectangular parallelepipeds whose faces are spaced apart to a greater or lesser extent from the surfaces of said grind wheels and form between them corners in which dust tends to accumulate. Said casings 5 and 5' provide incomplete static and dynamic confinement. A large fraction of the dust that is generated is ejected from said casings 5 and 5' and pollutes the glove box 6, insofar as it is not taken up in full by the suction nozzles 7, 7', and 7".

These drawbacks make it necessary to provide powerful suction and thus to overdimension the dust suction apparatus and the apparatus for treating the gaseous effluent from the glove box.

It has also been observed that some of the walls of said casings 5 and 5' can act as "impact filters", i.e. they become contaminated by projected dust particles becoming encrusted within them. It is practically impossible to decontaminate them

OBJECTS AND SUMMARY OF THE INVENTION

It is thus in this context and with reference to the technical problem of managing the dust that is generated, that the Applicant proposes and improved rectification method and apparatus. The Applicant seeks to minimize the pollution that is generated without imposing excessive constraints on the suction.

The method of the invention is a method of rectifying cylindrical articles by the abrasive action of a working grind wheel on the outside surface (the periphery) of each of said articles. In said method:

the articles are moved continuously in translation under the action of a driving grind wheel over the entire width of said working grind wheel, with this taking place on an alignment strip positioned between said working and driving grind wheels;

said working and driving grind wheels are rotated in the same direction, which direction causes said working grind wheel to act on said articles in a downward direction; and operation takes place in an open protection device (under static and dynamic confinement) with the generated rectification dust being sucked away.

To do this, the method of the invention is a rectification method of the type that is in use at present, in a rectifier of the kind shown diagrammatically in FIG. 1.

In characteristic manner, in the context of said method of the invention, the following take place in succession:

the generated rectification dust is confined statically and dynamically close to the surfaces of said working and driving grind wheels; this limits the volume subjected to contamination (a volume defined by surfaces without sharp edges) and also the gas flow rate that needs to be treated (as sucked in); this imparts a maximum speed to said dust;

practically all of said rectification dust as generated and confined beside the working grind wheel and the driving grind wheel is entrained towards the bottom of said working grind wheel in a flow of gas set up firstly by the rotation of said working grind wheel and secondly by implementing forced suction; said dust is captured by suction (of a minimum volume of gas given the confinement) in a single flow of gas, and for the purpose of this capture (or trapping), advantage is taken of the "skin effect" generated around the working grind wheel; and said rectification dust as generated, confined, and entrained (in a single gas flow) is taken away and recovered by said forced suction.

In characteristic manner, in the context of said method, close static and dynamic confinement is implemented so that the dust produced by rectification is trapped with optimum recovery efficiency (thereby minimizing pollution) and with a minimum suction flow rate (thus limiting the power of the compressor needed to provide the suction and the size of the filter device that needs to be provided downstream to recover the dust).

To ensure that the dust confined beside the driving grind wheel is entrained towards the bottom of the working grind wheel, it is necessary to provide for said dust to be transferred from beside the driving grind wheel to beside the working grind wheel. Said dust as generated and confined beside the driving grind wheel is advantageously transferred in order to be entrained beside the working grind wheel:

via at least one passage provided through the alignment strip that is positioned between the working and driving grind wheels, and that supports the article being rectified; this ensures that the dust generated beside the driving grind wheel is sucked away as close as possible to its site of production; in order to optimize such "near" suction, the passage in question presents a downwardly sloping axis; and/or via at least one passage formed beneath said alignment strip, level with the bottom portion of the driving grind wheel; thereby avoiding any accumulation of dust in said bottom portion.

In particularly advantageous manner, the dust that is generated and confined beside the driving grind wheel is transferred so as to be entrained beside the working grind wheel via a first passage provided through the alignment strip and via a second passage provided beneath said alignment strip, level with the bottom portion of said driving grind wheel.

The dust that is generated and confined about each of the working and driving grind wheels and as collected together and entrained downwards towards the bottom of said working grind wheel is taken away by suction from at least one point around said working grind wheel, which said at least one point is naturally downstream from the point(s) where the dust collects. Advantageously, the dust is taken away from a single point. Most advantageously, the dust is taken away tangentially from the bottom point of the working grind wheel.

To optimize this taking (this recovery) from one or more points (advantageously from a single point), the suction is implemented under conditions such that the speed of the gas that is taken away is much faster than the speed of any gas that is entrained past the point of suction by the rotation of the working grind wheel. For this purpose, the speed of the gas sucked into the inlet of the suction nozzle (or each of the suction nozzles) is advantageously two to three times greater than the peripheral speed of the working grind wheel. This naturally seeks to minimize the amount of dust that is entrained by the flow of gas that travels with the rotation of the working grind wheel by the "skin effect".

The dust-laden gas that is sucked away in this manner is subsequently purified in conventional manner. In particular it can be purified by filtering. The purified gas can be recycled.

As mentioned above, the method of the invention is implemented like the prior art method shown in FIG. 1 in a protection device that is "open" relative to the dynamic confinement in question. In an advantageous variant, said method of the invention is implemented within a glove box.

As also mentioned above, said method of the invention has been developed very particularly in the context of rectifying nuclear fuel pellets. Nevertheless, it is recalled that the invention is not limited to that context. The method is suitable for rectifying any piece that is circularly cylindrical. It is suitable in particular for rectifying such pieces when they are made of hard materials (e.g. ceramics or metals).

In a second aspect, the invention provides apparatus for rectifying cylindrical articles and suitable for implementing the above-described method. Like the prior art apparatus shown diagrammatically in FIG. 1, said apparatus comprises within an open protection device:

a working grind wheel;

a driving grind wheel;

means for setting said working and driving grind wheels into rotation at suitable speeds in the same direction, which direction ensures that the action of said working grind wheel on said articles is directed downwards;

an alignment strip suitably disposed between said grind wheels, suitable for supporting and moving said articles in translation over the entire width of said working grind wheel; and means for sucking away the rectification dust.

In characteristic manner:

within the protection device in question (a one-piece device or a device comprising a plurality of parts), the shapes of the working and driving grind wheels are followed as closely as possible so that only narrow spaces are left at their peripheries (spaces which are defined by surfaces without any sharp edges), for conveying streams of gas loaded to a greater or lesser extent with rectification dust; this taking place over at least half the circumference and advantageously over at least three-fourths of the circumference of each of said two grind wheels; said half and three-fourths circumferences being determined going downwards starting from the level of the top of the alignment strip;

the apparatus of the invention includes means for putting the narrow space provided around said driving grind wheel into communication with the narrow space provided around said working grind wheel; said means being located in and/or below said alignment strip; and the dust suction means are positioned so as to act at at least one point of said narrow space surrounding said working grind wheel, downstream in the direction of rotation of the working grind wheel from the outlet of said communication means.

Within such apparatus, the dust that is generated remains confined very close to the surfaces of the grind wheels, and is entrained and sucked away beside the working grind wheel.

The confinement around each of the two grind wheels can be optimized relative to the thickness of the narrow space in question and to its length around the periphery of each of said two grind wheels. Nevertheless, it is observed that the protection device used is advantageously open in its zone above the alignment strip for the purposes of observation and feeding gas (which gas could be referred to as sweeping gas).

The means providing communication between the narrow spaces provided around the working grind wheel and around the driving grind wheel (at least around the bottom portions of said two grind wheels) can be implemented in various ways.

In particular:

the alignment strip can include at least one passage, said passage advantageously having an axis that slopes downwards; and/or the support for said alignment strip can include at least one passage. Said support can form an integral portion of the protection device in question or it can constitute a separate fitting, independent of said protection device but naturally co-operating therewith.

In a preferred embodiment, in order to put said narrow space around the driving grind wheel into communication with said narrow space around the working grind wheel, the apparatus of the invention has a first passage through said alignment strip and a second passage beneath said alignment strip through the support for said strip.

With reference to the means for sucking away the dust channeled via the narrow space around the working grind wheel, the following can be specified: said means advantageously comprise a single suction nozzle, which nozzle is very advantageously located at the bottom of the working grind wheel.

In a variant embodiment, the apparatus of the invention can be disposed in a glove box.

BRIEF DESCRIPTION OF THE DRAWINGS

The method and apparatus aspects of the invention are described below in greater detail with reference to accompanying FIGS. 2 and 3.

MORE DETAILED DESCRIPTION

Figure 1:
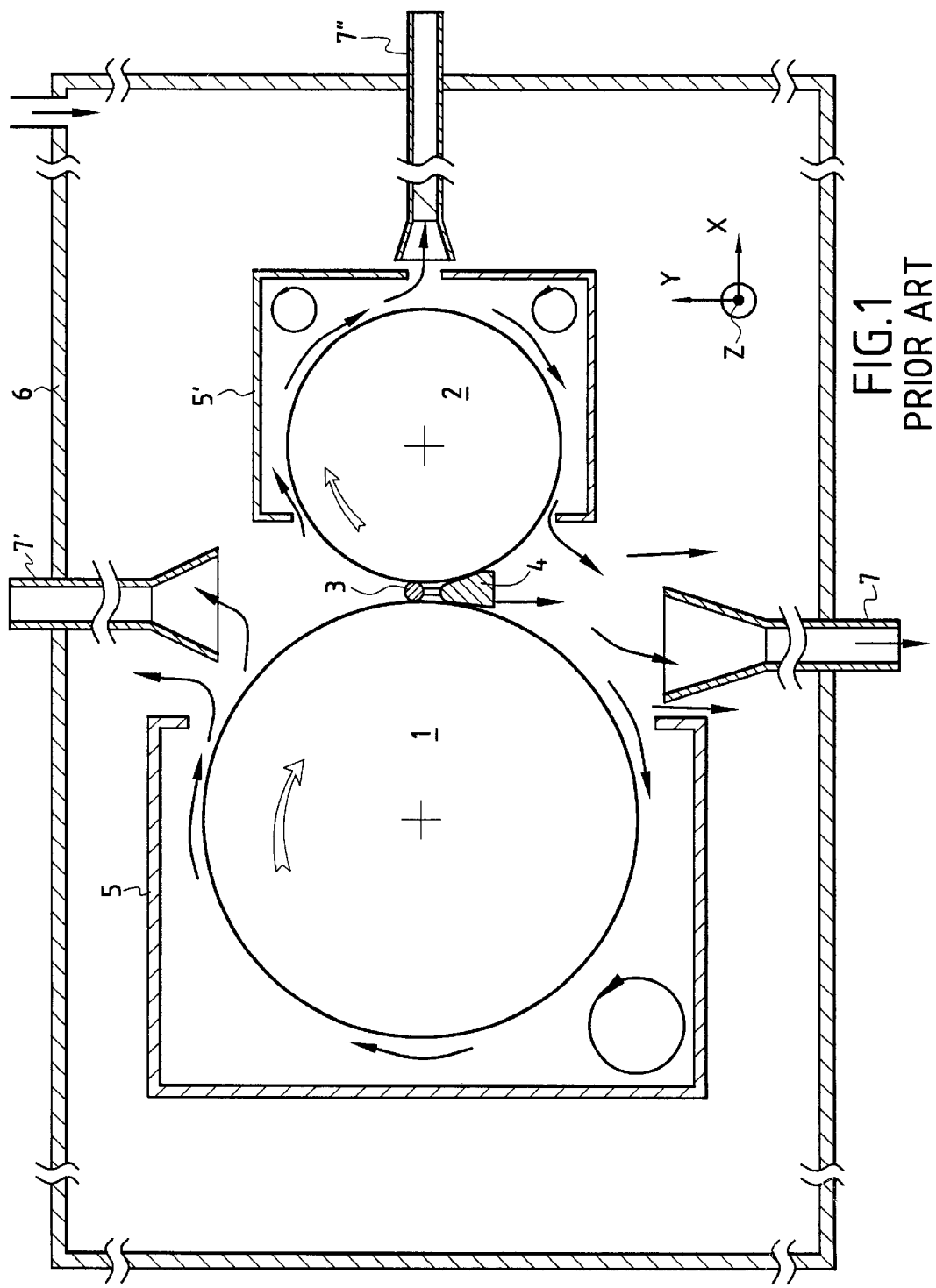

It is recalled that FIG. 1 shows the state of the art and is described in the introduction of the present specification.

Figure 2:
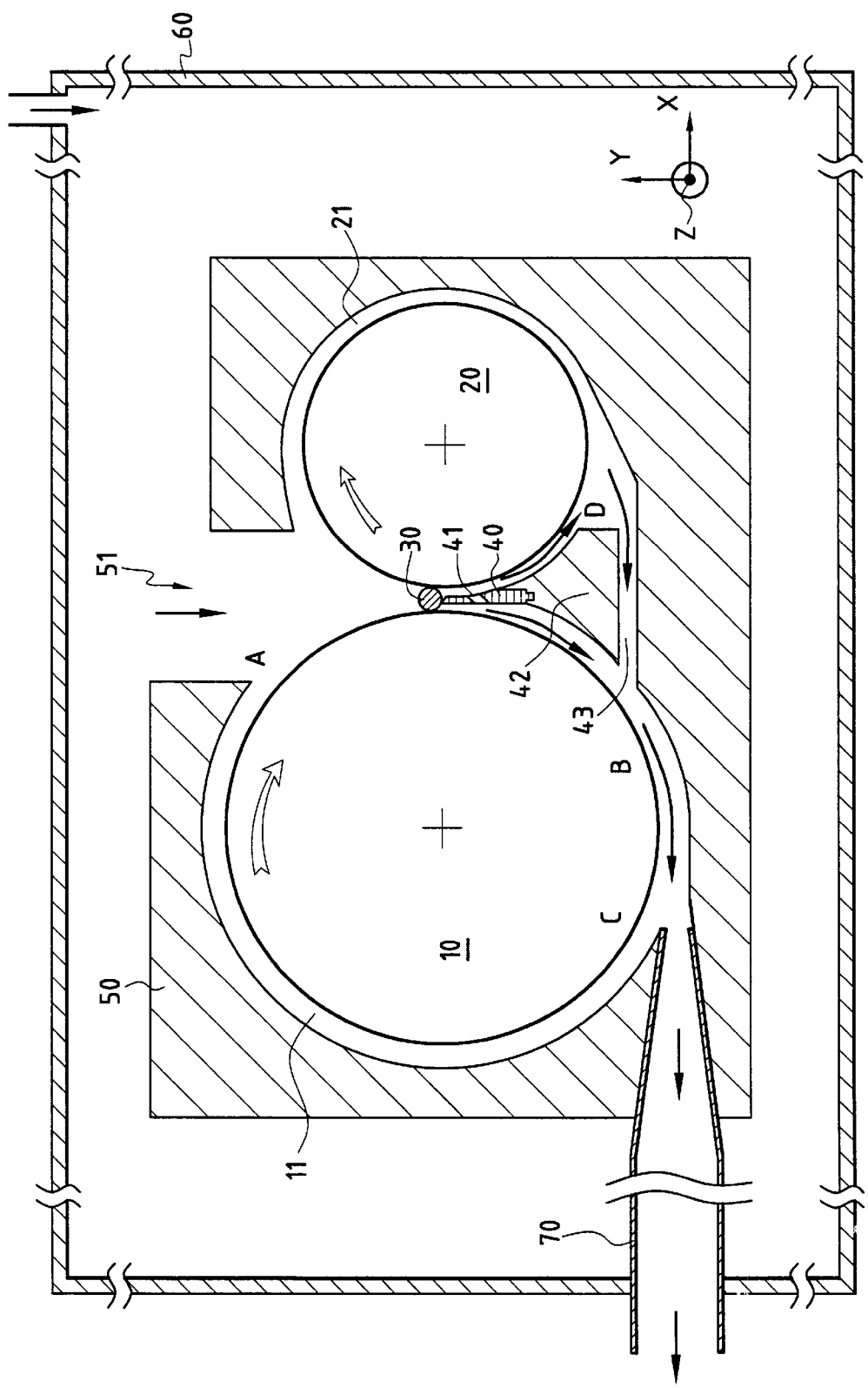
Figure 3:
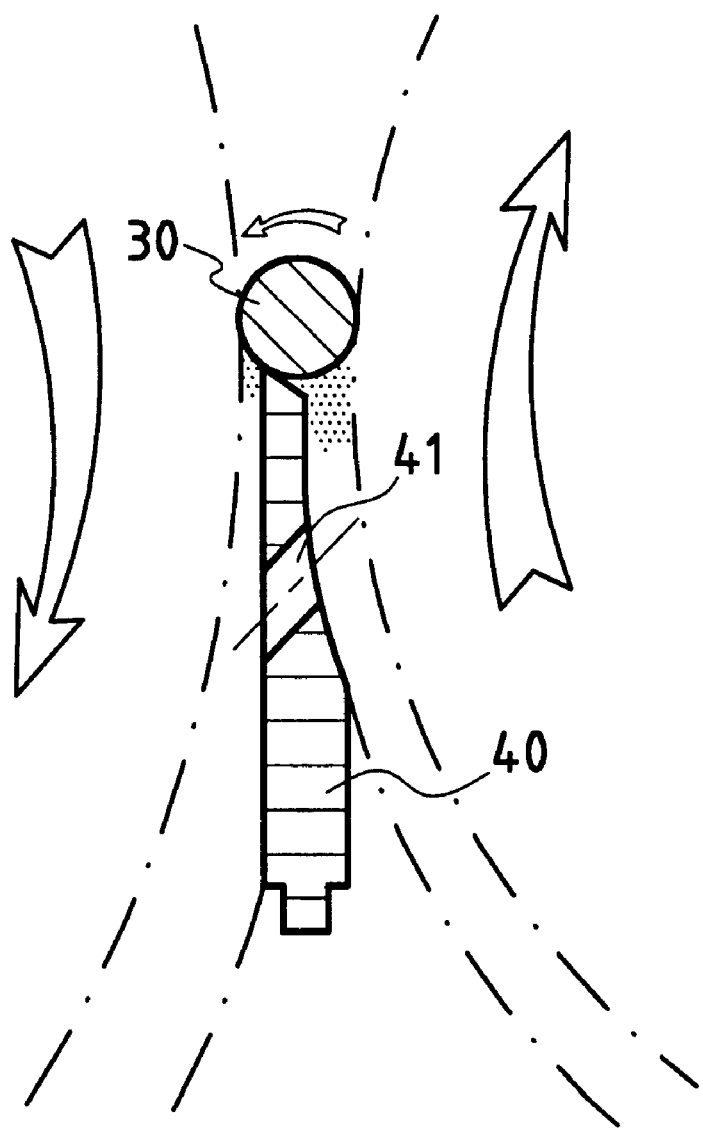

FIGS. 2 and 3 show:

the working grind wheel 10;

the driving grind wheel 20;

a pellet 30 being rectified; and the alignment strip 40 along which said pellet 30 progresses. Said pellet progressed along the axis Oz.

The respective directions of rotation of said grind wheels and pellets are represented by white arrows. The working grind wheel 10 and the driving grind wheel 20 rotate in the same direction (clockwise in FIGS. 2 and 3) which defines the direction in which abrasive action is developed by the working grind wheel 10 on the pellet 30, which direction is downwards.

The apparatus of the invention is located within a glove box 60.

In characteristic manner:

Both grind wheels 10 and 20 are confined in a casing 50 which envelops them as closely as possible, covering practically the entire periphery of each of them. Nevertheless, an empty space 51 is provided. The sweeping gas represented by black arrows is delivered through this empty space 51. It is also possible to observe the rectification that is taking place via said empty space 51. The spaces 11 and 21 provided respectively around the grind wheels 10 and 20 are thus narrow spaces.

Substantially all of the dust generated beside the driving grind wheel 20 is thus recovered via the passage (slot) 41 provided through the alignment strip 40 (with said dust thus being recovered immediately after it has been generated), and via a passage 43 provided through the support 42 for said alignment strip 40 (thus avoiding any accumulation of dust at D, the bottom point of the driving grind wheel 20, which dust is the one entrained by the rotation of said driving grind wheel 20 and the one which is not recovered through the first passage 41). Beside the working grind wheel 10, this dust is entrained together with the dust generated beside said working grind wheel 10 in the flow of gas set up firstly by the rotation of said working grind wheel 10 and secondly by the forced suction implemented by means of the suction nozzle 70.

Said suction is thus applied beside the working grind wheel 10 via the narrow space 11. In the advantageous variant shown, the suction is applied at a single point of said narrow space 11 at the bottom (point C) of said working grind wheel 10. The largest of the entrained particles, subject to the centrifugal acceleration field generated by the rotation of the working grind wheel 10 are thus concentrated in the vicinity of the inside wall of the casing 50 and are thus guaranteed to be picked up by the nozzle 70. At B, practically all of the dust generated by the rectification is recovered by the flow of gas. But at C practically all of said dust is sucked in.

The zone C-A has two flows of gas traveling through it in opposite directions:

a very narrow flow in contact with the working grind wheel 10, and entrained by the grind wheel by the "skin effect" in the direction of rotation of said grind wheel; and a flow that occupies substantially all of the narrow space 11 as set up by suction through the nozzle 70.

Between these two flows, turbulence serves to bring any particles that might be entrained towards A back towards C (i.e. towards the dust treatment unit situated downstream from the nozzle). This effect is obtained by the following means combined in ways familiar to the person skilled in the art:

the exact location and size of the suction nozzle 70;

the flow rate sucked in by said nozzle 70; and the dimensions of the spaces 11 and 21.

The Applicant has implemented the invention with apparatus as shown in FIGS. 2 and 3. Purely by way of illustration, the Applicant specifies the main operating parameters below.

The pellets to be rectified were $PuO_2+UO_2$ pellets presenting the following dimensions:

length generally lying in the range 10 millimeters (mm) to 14 mm; and diameter generally lying in the range 8 mm to 11 mm.

After rectification, the pellets are required to have a diameter that complies with specifications.

The working grind wheel had a diameter of 350 mm, a width of 120 mm, and rotated at 1500 revolutions per minute (rpm) to 1600 rpm while the driving grind wheel had a diameter of 230 mm, a width of 120 mm, and rotated at 40 rpm to 60 rpm.

Said two grind wheels were confined in a protection device of the same type as the casing 50 but that envelops them leaving narrow empty spaces (about 6 mm radially for the thickness of the spaces 11 and 21; and about 1.5 mm axially for the spaces between said grind wheels and the vertical end plates of said protection device, which spaces are not shown in FIG. 2).

Under such conditions, starting from a suction flow rate Q of about 150 cubic meters per hour (m$^3$/h) at standard temperature and pressure (stp), the gas flow between the working grind wheel and its protection device began to entrain particles that remained in contact with said working grind wheel towards C, and the flow rate ejected at A became practically zero. Thus, no dust was ejected at A and as a result there were practically no pollution of the glove box in which the apparatus of the invention was contained.

Using a suction rate lying in the range 150 m$^3$/h to 175 m$^3$/h at stp (for a working grind wheel width of 120 mm) served to limit any retention of dust inside the apparatus and did not cause any of said dust to be expelled from said apparatus into the glove box.

It was not to be expected that this good result of minimal or even no pollution of the glove box could be obtained with reasonable constraints on the amount of suction to be implemented. The Applicant originally thought that it would be necessary to use a nozzle downstream from the point C to blow in gas so as to ensure that particles entrained beyond the suction nozzle were returned to said point C. Unexpectedly, it has been found unnecessary to use such a nozzle.

What is claimed is:

1. A method of rectifying cylindrical articles, each having an outside surface, by abrasive action of a working grind wheel on the outside surface of each article, for producing rectification dust; said articles being moved continuously in translation by the action of a driving grind wheel along the entire width of said working grind wheel along an alignment strip positioned between said working grind wheel and said driving grind wheel; said working and driving grind wheels being rotated in the same direction, which direction is such that the action of said working grind wheel on said articles acts downwards, the method being implemented in an open protection device with the rectification dust that is generated being sucked away; the method comprising:

statically and dynamically confining the generated rectification dust very close to the surfaces of said working and driving grind wheels;

entraining practically all of said generated dust as confined beside the working grind wheel and beside the driving grind wheel towards the bottom of said working grind wheel in a flow of gas set up by said working grind wheel rotating and by implementing forced suction; and taking away practically all of said generated, confined, and entrained dust via said forced suction.

2. The method according to claim 1, wherein the dust that is generated and confined beside the driving grind wheel is transferred for entrainment beside the working grind wheel via at least one passage provided through said alignment strip, said passage advantageously having an axis that slopes downwards.

3. The method according to claim 1, wherein the dust that is generated and confined beside the driving grind wheel is transferred for entrainment to beside the working grind wheel via at least one passage provided beneath said alignment strip level with the bottom portion of said driving grind wheel.

4. The method according to claim 1, wherein said dust that is generated and confined beside the driving grind wheel is transferred for entrainment purposes to beside the working grind wheel via a first passage provided through said alignment strip and via a second passage provided beneath said alignment strip level with the bottom portion of said driving grind wheel.

5. The method according to claim 1, wherein said dust that is generated, confined, and entrained towards the bottom of said working grind wheel, is sucked away tangentially from the bottom point of said working grind wheel.

6. The method according to claim 1, wherein the speed of the gas that is sucked away is much faster than the speed of the gas that is entrained beyond said suction by the rotation of said working grind wheel.

7. The method according to claim 1, the method being implemented within a glove box.

8. The method according to claim 1, the method being implemented to rectify pellets of nuclear fuel.

9. Apparatus for rectifying cylindrical articles, within an open protection device, comprising:

a working grind wheel;

a driving grind wheel;

means for setting both of said grind wheels into rotation at suitable speeds in the same direction, which direction is selected so that the action of said working grind wheel acts downwards on said articles;

an alignment strip suitably positioned between said two grind wheels, suitable for supporting said articles and moving them in translation along the entire width of said working grind wheel; and means for sucking away rectification dust produced by the action of said two grind wheels;

wherein:

within said protection device the shapes of said working and driving grind wheels are followed as closely as possible so that only narrow spaces are maintained around their peripheries for passing a flow of gas more or less heavily leaden with the rectification dust; with this taking place over at least half the circumference and advantageously over at least three-fourths of the circumference of each of said two grind wheels; said half and three-fourths circumferences being measured going downwards from the top of the alignment strip;

said protection device including means for putting said narrow space around said driving grind wheel into communication with said narrow space around said working grind wheel; said putting means being located at one of through and beneath said alignment strip; and said means for sucking away being positioned to act at least one point of said narrow space surrounding said working grind wheel, downstream in the direction of rotation of said working grind wheel from an outlet of said sucking away means for putting said spaces into communication.

10. The apparatus according to claim 9, wherein said protection device is open in a zone overlying said alignment strip for the purposes of observation and feeding gas.

11. The apparatus according to claim 9, wherein said alignment strip has at least one passage for putting said narrow space around said driving grind wheel into communication with said narrow space around said working grind wheel; said passage advantageously presenting an axis that slopes downwards.

12. The apparatus according to claim 9, wherein the support for said alignment strip, forming a portion of said protection device or constituting a piece that is fitted thereto, has at least one passage for putting said narrow space around said driving grind wheel into communication with said narrow space around said working grind wheel.

13. The apparatus according to claim 9, wherein, for putting said narrow space around the driving grind wheel into communication with said narrow space around the working grind wheel, it has a first passage through said alignment strip and a second passage beneath said alignment strip through the support of said alignment strip.

14. The apparatus according to claim 9, wherein said suction means are constituted by a single suction nozzle.

15. The apparatus according to claim 14, wherein said suction nozzle is placed tangentially to the bottom point of said working grind wheel.

16. The apparatus according to claim 9, the apparatus being disposed within a glove box.

* * * * *